US011314527B2

(12) United States Patent
Nelson

(10) Patent No.: US 11,314,527 B2
(45) Date of Patent: Apr. 26, 2022

(54) SYSTEM AND METHOD FOR MANAGING REFERENCE-COUNTED LIFECYCLES OF CONTEXTS AND DEPENDENCY INJECTION (CDI) COMPONENTS

(71) Applicant: ORACLE INTERNATIONAL CORPORATION, Redwood Shores, CA (US)

(72) Inventor: Laird Nelson, Bainbridge Island, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/746,324

(22) Filed: Jan. 17, 2020

(65) Prior Publication Data
US 2020/0364062 A1 Nov. 19, 2020

Related U.S. Application Data

(60) Provisional application No. 62/900,265, filed on Sep. 13, 2019, provisional application No. 62/849,613, filed on May 17, 2019.

(51) Int. Cl.
*G06F 9/445* (2018.01)
(52) U.S. Cl.
CPC ............... *G06F 9/44526* (2013.01)
(58) Field of Classification Search
CPC .................................. G06F 9/44526
USPC ........................................ 717/120
See application file for complete search history.

(56) References Cited

U.S. PATENT DOCUMENTS

| 6,075,863 A * | 6/2000 | Krishnan et al. ... G06F 9/44526 709/227 |
| 2019/0146902 A1* | 5/2019 | Jiang et al. ......... G06F 11/3688 717/129 |

OTHER PUBLICATIONS

Antoine Sabot-Durand, "JSR 365 Contexts and Dependency Injection for Java 2.0", Apr. 20, 2017, 201 pages.
Oracle, "Java Platform, Enterprise Edition (Java EE) 8, The Java EE Tutorial", Copyright 2017, 1 page.
Oracle, "The Java EE 6 Tutorial", Jan. 2013, 1010 pages.
Oracle, "Java Platform, Enterprise Edition" The Java EE Tutorial Release 7, Sep. 2014, 980 pages (9 parts).
Michael Redlich, "Project Helidon Tutorial: Building Microservices wtih Oracle's Lightweight Java Framework", retrieved on Dec. 9, 2021 , retrieved from <https://www.infoq.com/articles/helidon-tutorial>, 10 pages.

* cited by examiner

*Primary Examiner* — Wei Y Zhen
*Assistant Examiner* — Mohammed N Huda
(74) *Attorney, Agent, or Firm* — Tucker Ellis LLP

(57) ABSTRACT

Described herein are systems and methods for managing reference counted lifecycles of contexts and dependency injection (CDI) components. The systems and methods described herein provide new constructs that allow for managing and monitoring CDI object lifecycles. Put together, these constructs permit specifications (e.g., JPA) to be fully implemented in a lightweight CDI ecosystem without reliance on typical application servers.

20 Claims, 5 Drawing Sheets

SYSTEM AND METHOD FOR MANAGING REFERENCE-COUNTED LIFECYCLES OF CONTEXTS AND DEPENDENCY INJECTION (CDI) COMPONENTS

CLAIM OF PRIORITY

This application claims priority to U.S. Provisional Patent Application entitled "SYSTEM AND METHOD FOR MANAGING REFERENCE-COUNTED LIFECYCLES OF CONTEXTS AND DEPENDENCY INJECTION (CDI) COMPONENTS", Application No. 62/900,265, filed on Sep. 13, 2019, and to U.S. Provisional Patent Application entitled "SYSTEM AND METHOD FOR MANAGING REFERENCE-COUNTED LIFECYCLES OF CONTEXTS AND DEPENDENCY INJECTION (CDI) COMPONENTS", Application No. 62/849,613, filed on May 17, 2019, each of which applications are herein incorporated by reference in their entirety.

TECHNICAL FIELD

Embodiments described herein are generally related to systems and methods for software development, including support for developing microservice-based software applications based upon a collection of libraries, for example, Java libraries.

BACKGROUND

A microservices architecture can be used for the creation of cloud services or other types of microservice-based software applications. Systems or frameworks that support the building of such microservices, for example, based on Java, can comprise a set of libraries, for example, Java libraries, that are used for the creation of microservices.

In general, microservices enable the development of software applications or services that utilize pre-existing services/libraries that can be called upon by a developer. Because microservices can be based upon pre-existing services and libraries, this provides certain benefits, such as allowing the decomposition of software development into fine-grained pieces, increasing modularity; an easier-to-understand software development process; and the development of software and services are less prone to failure.

SUMMARY

Described herein are systems and methods for managing reference counted lifecycles of contexts and dependency injection (CDI) components, in accordance with an embodiment. The systems and methods described herein provide constructs that allow for managing and monitoring CDI object lifecycles. Put together, these constructs permit specifications (e.g., JPA—Java Persistence Architecture) to be fully implemented in a lightweight CDI ecosystem, without reliance on typical application servers.

In accordance with an embodiment, Contexts and Dependency Injection (CDI) provides a specification that governs how certain applications (e.g., Java applications) are composed. As specified by CDI, a Context implementation is a component within that ecosystem that manages lifecycles of objects (e.g., Java objects, such as entity managers) in a CDI-based application.

In accordance with an embodiment, application programmers, when programming a new application in a CDI environment, do not usually create and destroy objects, but instead request that an object of a particular type be provided for use within the application. A Context implementation can then be responsible for deciding when to create and destroy these objects. Since otherwise boilerplate logic for deciding when and how to create and destroy these objects is packaged into a Context component, the number of bugs in the application being developed is reduced.

In some embodiments, a Context implementation might create an object when it is first requested, and might never destroy it. Components requesting objects that are managed by this Context would therefore all receive the same object.

Another Context might create an object when a request is received, and might destroy it when the request has been processed. Components requesting objects that are managed by such a Context would therefore receive the same object only when such components are working on the same request, and would receive new objects when working on different requests.

Still other Contexts might scope an object's lifespan to that of a user's session in an application, or a function call; or a Context might simply create a new object of a particular type whenever it is requested.

In the embodiments described herein, a custom Context providing a custom lifecycle is provided. This context can manage object lifecycles by tracking their references, and destroying those objects when the number of references drops to zero (or below).

DETAILED DESCRIPTION

Figure 1:
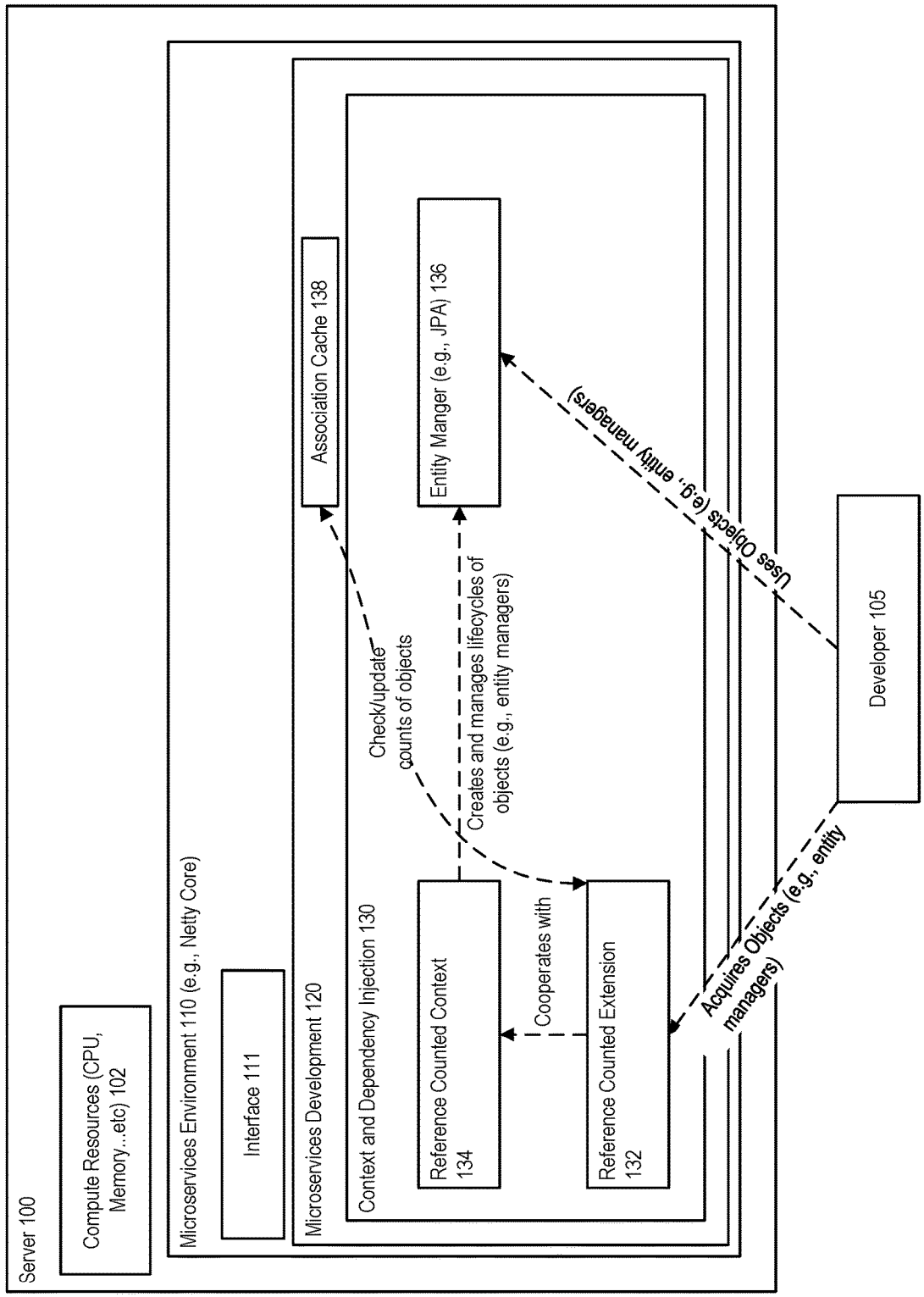
FIG. 1 illustrates a system for managing reference counted lifecycles of contexts and dependency injection (CDI) components, in accordance with an embodiment.

Some Java EE environments, and application servers that use Java EE, may be perceived as not sufficiently lightweight or nimble for today's microservices world. This presents issues with migrating/moving Java EE resources, or resources based on other programming languages, to other more cloud-friendly, microservices platforms. In such scenarios, it is desirable to preserve/retain an application programmers' knowledge (e.g., certain programming knowledge associated with Java EE), and pre-existing code.

In accordance with an embodiment, a microservices platform can be hosted on an asynchronous event-driver network application framework. Such a platform can enable developers to build small, focused microservices, such as Java microservices.

In accordance with the above example, the Java Persistence Architecture (JPA) specification governs how Java objects are persisted to and retrieved from relational databases. This specification describes several lifecycles that any JPA implementation must implement.

In accordance with an embodiment, however, in the case of JPA, and other specifications that mandate lifecycles for objects, such lifecycles are not realizable using built-in CDI mechanisms. More specifically, in accordance with an embodiment, CDI's built-in Contexts can create only request-scoped objects, application-lifetime-scoped objects and dependent objects. A profile implementation wishing to incorporate JPA, or another specification, fully and correctly will need a mechanism to implement required lifecycles in terms of CDI Contexts.

In accordance with an embodiment, described herein are systems and methods for managing reference-counted lifecycles of contexts and dependency injection (CDI) components. The systems and methods described herein provide constructs that allow for managing CDI object lifecycles. Put together, these constructs permit specifications (e.g., JPA) to be fully implemented in a lightweight CDI ecosystem without reliance on typical application servers.

Managing Reference Counted-Lifecycles of Contexts and Dependency Injection

In accordance with an embodiment, software/application developers are already familiar with certain programming languages, such as Java EE, which can call on and use JPA. In order to port/migrate JPA to a microservices platform, however, there needs to be certain mandates in place.

For example, Java EE architecture mandates that there are certain, specified lifecycles for certain JPA objects. For example, for an entity manager (i.e., an object provided by CDI), in Java EE setting, developers are used to just calling an entity manager and Java EE provides it and manages the lifecycle. However, when removing JPA from Java EE, the mandate for managing the lifecycle of the entity manager is still in place, but Java EE is no longer present to manage it.

In accordance with an embodiment, a context can be thought of as a source for objects to be used within a development environment, such as a microservices environment. The present systems and methods provides a context that allows the management of lifecycles of objects within a microservices environment, as well as keeping track of objects within the environment.

Reference Counted Context

In accordance with an embodiment, a Reference Counted Context (also referred to within this application as ReferenceCountedContext) construct can be provided in conjunction with a CDI within a microservices environment. The Reference Counted Context is a Context implementation. It is accompanied by a Reference Counted Extension (also referred to within this application as ReferenceCountedExtension)—a CDI portable extension that installs it and works with it to count CDI object references within the environment.

In accordance with an embodiment, the Reference Counted Context is responsible for supplying instances of relevant objects to callers that request them. While doing so, it is responsible for keeping track of their overall reference counts as measured by the number of CDI Injection Points representing the requests. It also provides the ability to decrement the reference counts that is ultimately expected to be called by the ReferenceCountingProducer described below.

Static ThreadLocal Map of Instances

In accordance with an embodiment, ReferenceCountedContext described above can maintain a (by definition thread-safe) static ThreadLocal (e.g., a cache) variable that maps ReferenceCountedContext instances to Maps of instances of objects indexed by the Beans that created them. The Map this variable ultimately represents is where instances that are returned by the get(Contextual, CreationalContext) method are sourced from.

get(Contextual, CreationalContext) Method

In accordance with an embodiment, the ReferenceCountedContext get(Contextual, CreationalContext) method can perform the following steps when an object is requested:

If the ThreadLocal-sourced map (cache) contains an instance of the requested object under the supplied Contextual, a reference count associated with it is incremented, and the instance is returned.

If the ThreadLocal-sourced Map does not contain an instance of the requested object under the supplied Contextual, the Contextual's create(CreationalContext) method is called following the CDI specification.

The resulting instance's reference count is incremented.

The resulting instance is stored in the Map (cache) under the supplied Contextual.

The resulting instance is returned.

In accordance with an embodiment, the net effect is that no new objects will be created in response to a request as long as an object of the desired type is already present in the Map (cache). Also, any bean with an InjectionPoint that references this kind of object will result in the reference count being incremented.

DecrementReferenceCount(Contextual) Method

In accordance with an embodiment, the ReferenceCountedContext decrementReferenceCount(Contextual) method can perform the following steps when the ReferenceCountedContext receives an indication that an instance of an object, or its associated host object, have been destroyed:

Looks up the instance stored in the ThreadLocal Map indexed under the Contextual.

If an instance is found, its reference count is decremented.

If the instance's reference count becomes zero (or for any reason less than zero) the Contextual's destroy(Object, CreationalContext) method is called with the instance and the CreationalContext that was originally used at creation time, and the instance is removed from the Map (cache).

In accordance with an embodiment, the net effect is that decrementing a reference count to or below zero will result in the ReferenceCountedContext creating a new instance of the relevant type of object later on in response to a request for a new instance of the object, rather than returning the existing instance.

Reference Counted Extension

In accordance with an embodiment, a portable extension (such portable extension can be referred to herein as "ReferenceCountedExtension") can be provided that is responsible for installing the ReferenceCountedContext, discovering types whose instances need to be reference counted, and arranging the systems such that a CDI object's destruction will result in the reference counts of any relevant objects it may refer to being decremented appropriately.

In accordance with an embodiment, the ReferenceCountedExtension, the portable extension, can be used in conjunction with the ReferenceCountedContext to implement the custom cache service that can cache created objects for the lifecycle of the first requesting client/the first requesting object from a client. That is, the cache can maintain a created object, for example an entity manager, during the time period that a requesting object (e.g., an object of a client that requests an entity manger from the ReferenceCountedContext) maintains a lifecycle. Upon the lifecycle of requesting object, which is monitored by the ReferenceCountedExtension, ending, the ReferenceCountedExtension can signal the ReferenceCountedContext to decrement a count of the created object within the cache. If the count is decremented to zero, then the object can be removed from the cache, thus freeing up space within the space constrained environment.

In accordance with an embodiment, this portable extension allows for monitoring of lifecycles of any object in the system and addresses the issues presented by the inability of the context to track where a provided/requested object is going, and to track the lifecycle of the host object associated with the provided object.

In accordance with an embodiment, CDI provides a standardized lifecycle. The described portable extension adds the ability to find and register "injection points" for types of objects provided by a context. By using the portable extension, CDI can track host objects that could potentially ask for an object. At startup, with the use of the portable extension, CDI can scan all host objects that are within its purview. Based upon this scan, CDI can identify a number of types of injection points ("slots") within the host objects. Each injection point can be object-type specific, and CDI can identify a context that is capable of providing the specific object-type for each injection point. In this manner, CDI maintains a memory of how each injection point can be filled.

In accordance with an embodiment, for example, a certain context produces entity managers (which are objects). At startup, with the use of the portable extension, CDI can identify all host objects that have injection points of entity manager type. Whatever host object has the injection point is mapped and stored. The reference counting portable extension keeps track of this host object, and increments the object count at the cache when the object (entity manager) is provided by CDI. If this host object dies, then then CDI can call decrement count on the object in the cache.

In accordance with an embodiment, the ReferenceCountedExtension works hand-in-hand with the ReferenceCountedContext class described above, and with a nested class it defines another construct, namely the ReferenceCountingProducer.

In accordance with an embodiment, the portable extension can monitor the lifecycle of each calling object within its purview. By monitoring the lifecycle of each calling object, the portable extension provides the ability to link the lifecycle of context created object (e.g., an entity manager) directly to the lifecycle of the calling object, and not to, for example, the lifecycle of the first calling object. As such, the ReferenceCountedExtension can, by monitoring the lifecycles of requesting objects, signal the ReferenceCountedContext upon incidents of a lifecycle beginning (increment a count of the object within the cache), or lifecycle ending (decrement a count of the object within the cache).

In addition, the portable extension can also ensure that created objects are not kept within a cache during the entire lifecycle of a client, but rather only during the lifecycle of the requesting object. In this way, then, the portable extension allows CDI to maintain a smaller, more nimble cache, which is desirable within a space-constrained environment, such as a microservices environment.

In accordance with an embodiment, in addition to providing lifecycle monitoring of calling objects within the purview of CDI, the portable extension can additionally perform tasks associated with traffic management and overseeing of traffic within the purview of CDI. By monitoring the traffic to and from, for example, a specific calling object within the purview of CDI, the portable extension can better assess when a calling object has been terminated, thus allowing CDI to remove a called object (e.g., an entity manager) from the cache associated with CDI.

ReferenceCountingProducer

In accordance with an embodiment, the ReferenceCountingProducer construct is responsible for keeping track of object destruction regardless of where it happens in the CDI ecosystem and decrementing reference counts of relevant destroyed objects.

In accordance with an embodiment, the ReferenceCountingProducer is a Producer implementation. Producers produce and dispose of contextual instances and form the innards of Beans. A Bean is a factory of contextual instances. Beans are used by Contexts to create and destroy instances (by way of their inner, opaque Producer implementations). Contexts then manage those instances' lifecycles, deciding when and where to cause instance creation and destruction to happen. Producers are normally invisible to application programmers. They are made available to CDI portable extensions by way of CDI's ProcessProducer and ProcessInjectionTarget container lifecycle events.

In accordance with an embodiment, the ReferenceCountingProducer is initialized with a delegate Producer, normally supplied by the CDI container by way of a ProcessInjectionTarget event observed by the ReferenceCountingExtension.

Produce(CreationalContext) Method

In accordance with an embodiment, a ReferenceCountingProducer's produce(CreationalContext) method implementation can perform the following:
  The first time it is invoked, it can initialize a Set of InjectionPoints that will constitute those InjectionPoints referring to the kind of object whose references should be counted.
    For each InjectionPoint in its delegate's Set of InjectionPoints:
      The delegate InjectionPoint is examined to see if it has previously been marked as an InjectionPoint whose instances should be reference counted. If so, it is added to the Set.
  The delegate's produce(CreationalContext) method is then invoked as if nothing else has happened.
  The result is a Set of Injection Points that will hold instances whose references should be decremented upon their destruction.

Dispose(Object) Method

In accordance with an embodiment, the ReferenceCountingProducer's dispose(Object) method does can perform the following steps:
  For each InjectionPoint in the Set initialized by the produce(CreationalContext) method (described above):
    The Injection Point's type is used to look up the Bean that is ultimately responsible for creating its instances.
    The Bean is used to look up the Context that is responsible for managing its instances.
    If the Context in question is a ReferenceCountedContext, which is expected given the behavior of the produce(CreationalContext) method described above, then its decrementReferenceCount(Contextual) method is called.

ReferenceCountedExtension Observer Methods

In accordance with an embodiment, CDI has a standardized startup sequence. When a CDI application starts, portable extension objects (implementations of the javax.enterprise.inject.spi.Extension interface) are discovered and created. Portable extensions may (among many, many other things) supply custom Context implementations to the core CDI container. They may also arrange to have certain of their observer methods, if any, be notified when particular kinds of objects are created and destroyed, regardless of which Context created and destroyed them.

In accordance with an embodiment, the ReferenceCountedExtension's observer methods are set up to ensure that all CDI objects in the system that refer to other CDI objects whose instances should be reference counted are destroyed in such a way that their references to those objects are decremented appropriately and in such a way that the ReferenceCountedContext can be informed of these destructions.

In accordance with an embodiment, the ReferenceCountedExtension can perform the following steps:

- It sets up a Set to hold Java types known to be managed by the ReferenceCountedContext. The Set is initially empty.
- It observes the ProcessInjectionTarget container lifecycle event, ensuring that it is notified when any CDI managed bean is discovered.
    - It acquires the InjectionTarget from the observed ProcessInjectionTarget event representing the collection of InjectionPoints that the bean has made available for dependency injection.
    - It creates a ReferenceCountingProducer wrapping this InjectionTarget. See the section on ReferenceCountingProducer for details.
    - It creates a new InjectionTarget.
        - The new InjectionTarget's produce(CreationalContext) method is implemented to call the produce(CreationalContext) method of the ReferenceCountingProducer.
        - The new InjectionTarget's dispose(Object) method is overridden to call the dispose(Object) method of the ReferenceCountingProducer.
    - It calls setInjectionTarget(InjectionTarget) on the ProcessInjectionTarget event, passing the new InjectionTarget, thus replacing the ordinary container-supplied InjectionTarget with the new one. Now the CDI bean the InjectionTarget represents will automatically decrement reference counts for certain relevant objects when it is destroyed.
- It observes the ProcessBean container lifecycle event, ensuring that it is notified when any CDI bean of any kind is discovered.
    - It examines the Bean from the event to see if it is managed by the ReferenceCountedContext.
        - If it is, then the Bean's bean types are added to the Set of such types created when the ReferenceCountedExtension was initialized. (This Set is used by the ReferenceCountingProducer class described elsewhere in this document.)
- It observes the ProcessProducer container lifecycle event, ensuring that it is notified when any CDI producer field or producer method is discovered.
    - It acquires the Producer from the observed ProcessProducer event representing the collection of InjectionPoints that the bean has made available for dependency injection.
    - It creates a ReferenceCountingProducer wrapping this Producer. See the section on ReferenceCountingProducer for details.
    - It creates a new Producer.
        - The new Producer's produce(CreationalContext) method is implemented to call the produce(CreationalContext) method of the ReferenceCountingProducer.
        - The new Producer's dispose(Object) method is overridden to call the dispose(Object) method of the ReferenceCountingProducer.
    - It calls setProducer(Producer) on the ProcessProducer event, passing the new Producer, thus replacing the ordinary container-supplied Producer with the new one. Now the CDI producer field or producer method the Producer represents will automatically decrement reference counts for certain relevant objects when the instances it makes are destroyed.

FIG. 1 illustrates a system for managing reference counted lifecycles of contexts and dependency injection (CDI) components, in accordance with an embodiment.

In accordance with an embodiment, a server 100, having compute resources 102, such as CPU, memory, storage . . . etc., can host a microservices environment 110, for example a Netty Core. Such a microservices environment can comprise an asynchronous, event-driven network application framework. This can be, for example, a client server framework that enables development of applications (e.g., network applications such as protocol servers and clients). The microservices environment 110 can comprise an interface 111, which can comprise, for example, an application programming interface (API), a graphical user interface (GUI), a command line interface . . . etc. The microservices environment 110 can additionally provide a microservices development 120 environment, which can received instructions from, e.g., a developer 105 to construct one or more microservices.

In accordance with an embodiment, the microservices environment can receive instructions from a developer 105 in writing a program in the overall microservices environment 100 (or any other CDI-based environment). For example, in constructing an application, the microservices environment can receive an instruction requesting, e.g., from a context, an object. In the example shown in FIG. 1, the developer is requesting. From a context and dependency injection 130, an entity manager in the normal CDI fashion.

In accordance with an embodiment, CDI can respond by requesting the relevant context—in this case a ReferenceCountedContext 134—to acquire the desired object (e.g., an entity manager).

In accordance with an embodiment, the ReferenceCountedContext 134, in conjunction with the ReferenceCountedExtension 132 can cooperate to produce and then manage an instance of entity manager 136.

In accordance with an embodiment, the developer can then take delivery of the entity manager 136 as requested and use it without knowing the details of the object's (in this case, an entity manager's) lifecycle management.

In accordance with an embodiment, an association cache 138 can be provided in which instances of objects, as well as counts of objects, used in the microservices development 120 are tracked. For example, a first instance of an entity manager can be pre-existing, with a non-zero count, within the microservices development 120.

In accordance with an embodiment, CDI can, prior to providing the requested entity manager, check within an association cache 138 (map) to determine if an instance of the requested entity manager is already active within the environment 120. If so, then instead of creating the requested entity manager, CDI can provide a copy/instance of the existing entity manager, increase a count within the cache (map), and track the lifecycle of the entity manager through the use of the portable extension as described above.

In accordance with an embodiment, and more specifically, a portable extension (e.g., the Reference Counted Extension)

associated with CDI can, upon startup, scan the host objects, via the association cache 138, it has control over and determine that the host object that the application programmer is working on as an injection point of "entity manager" type.

In accordance with an embodiment, when the entity manager is requested and deployed to the host object, the portable extension can wrap the host object such that upon the host object's lifecycle ending (the host object being destroyed), a signal can be provided such that a count on the entity manager within the association cache can be decremented.

In accordance with an embodiment, as described above, if the count on the entity manager within the cache (map) reaches zero or below, the entity manager object can be removed from the cache until such time that another instance of the object is requested, at which point CDI will then create a new instance of the entity manager, and increase the count within the cache.

Figure 2:
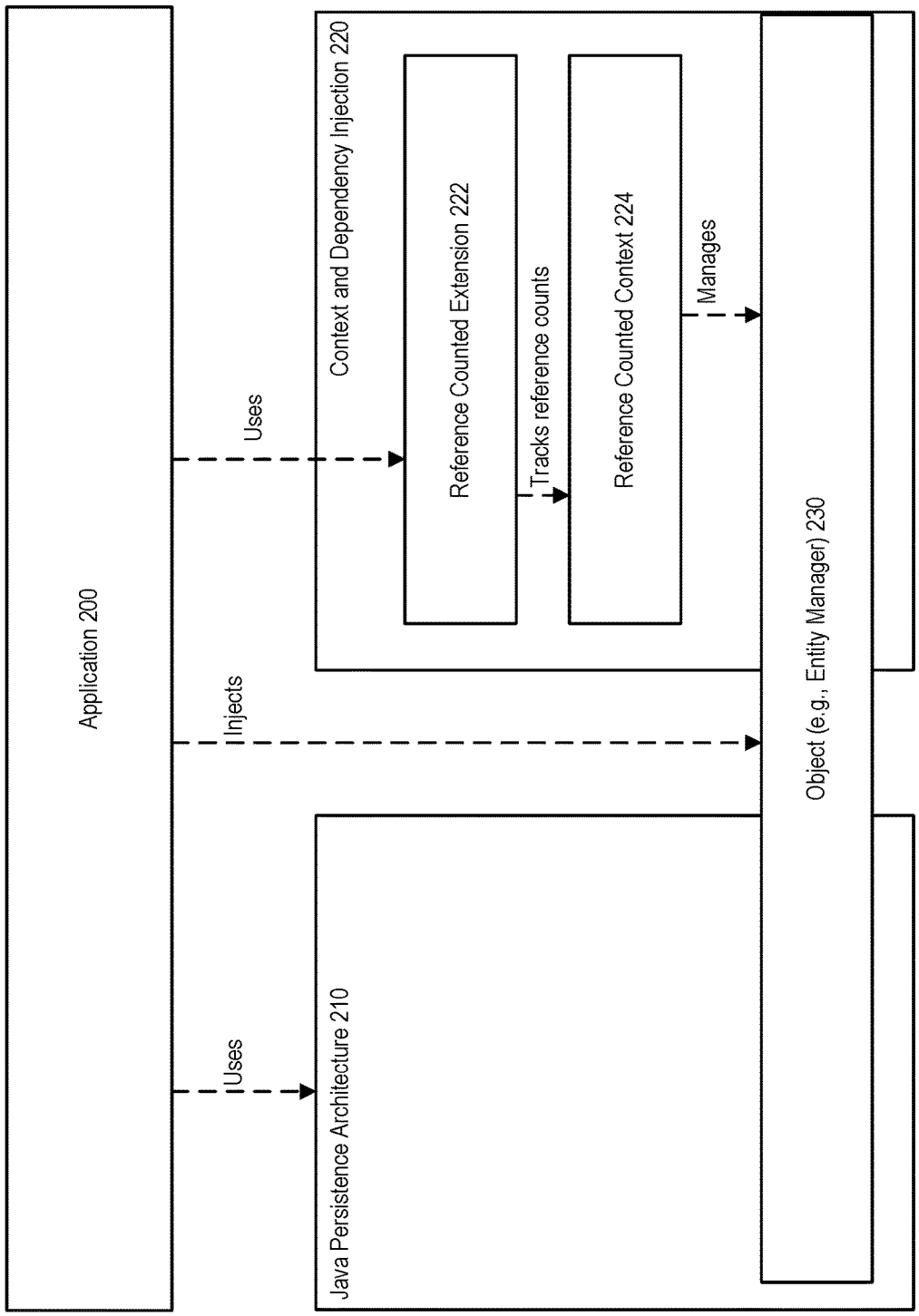
FIG. 2 illustrates a system for managing reference counted lifecycles of contexts and dependency injection (CDI) components, in accordance with an embodiment.

FIG. 2 illustrates a system for managing reference counted lifecycles of contexts and dependency injection (CDI) components, in accordance with an embodiment.

In accordance with an embodiment, an application 200 can use a number of objects 210, such as JAVA persistence architecture objects, including entity managers 230, as well as general CDI constructs 220.

In accordance with an embodiment, within the microservices development environment, the ReferenceCountedContext 224 cooperates with the ReferenceCountedExtension 222 to control how the entity manager objects 230 are injected. CDI 220 can utilize the various constructs, such as ReferenceCountedExtension 222 and ReferenceCountedContexts 224 to track the reference counts at an associated cache, and to manage the lifecycle of the objects, in this case an entity manager.

Figure 3:
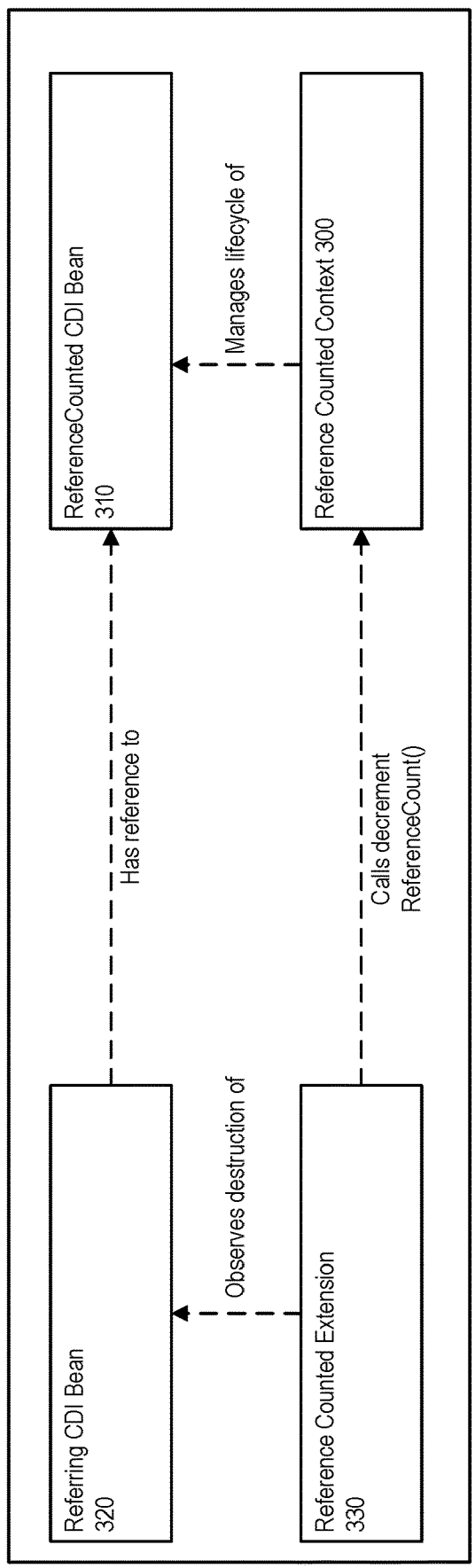
FIG. 3 illustrates a system for managing reference counted lifecycles of contexts and dependency injection (CDI) components, in accordance with an embodiment.

FIG. 3 illustrates a system for managing reference counted lifecycles of contexts and dependency injection (CDI) components, in accordance with an embodiment.

In accordance with an embodiment, a ReferenceCountedContext 300 manages the lifecycles of CDI beans 310 that have been marked as ReferenceCounted.

In accordance with an embodiment, a ReferenceCountedExtension 330 finds referring beans 320 ("host beans") and finds wherever there are references to ReferenceCounted beans 310. These "referring beans" can be thought of as the requesting objects discussed above in the context of the disclosed portable extension. Via the portable extension, then, CDI can monitor the lifecycle of the referring beans/host beans/requesting objects, via, for example, traffic management and traffic overseeing, to observe the lifecycle of any given referring bean within the purview of CDI.

In accordance with an embodiment, the ReferenceCountedExtension 330 further observes the destruction of these referring beans 320, via the portable extension discussed above, and, when destruction occurs, it calls decrementReferenceCount( ) on the ReferenceCountedContext. In this way, the ReferenceCountedExtension 330 monitors the lifecycle of the requesting/referring beans to determine when each lifecycle of such beans ends. Upon the cessation of the lifecycle, the ReferenceCountedExtension 330 calls the ReferenceCountedContext 300 with an instruction to decrement the count within the cache (not shown) of the created object (e.g., entity manager) by 1, corresponding to the destruction of the requesting/referring bean.

In accordance with an embodiment, when the ReferenceCountedContext's reference count for that ReferenceCounted bean drops to zero, the ReferenceCountedContext destroys the ReferenceCounted bean.

Figure 4:
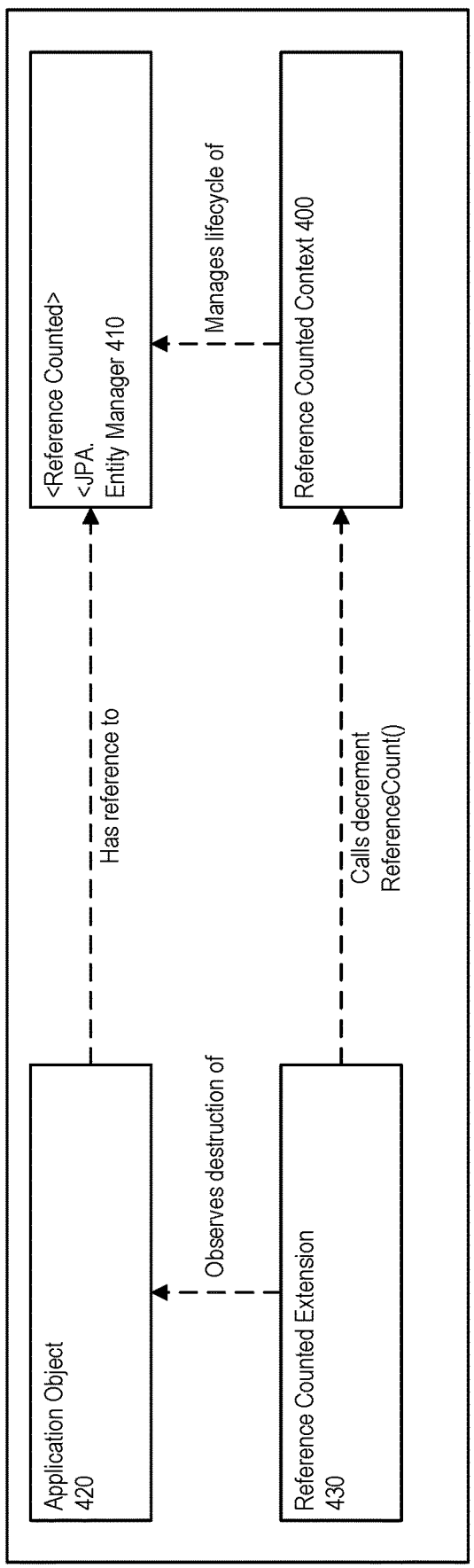
FIG. 4 illustrates a system for managing reference counted lifecycles of contexts and dependency injection (CDI) components, in accordance with an embodiment.

FIG. 4 illustrates a system for managing reference counted lifecycles of contexts and dependency injection (CDI) components, in accordance with an embodiment.

More specifically, FIG. 4 illustrates an example where an Application Programmer writing an object that refers to a JPA entity manager.

In accordance with an embodiment, a ReferenceCountedContext 400 manages the lifecycle of an entity manager 410 that have been marked as ReferenceCounted within the Java Persistence Architecture.

In accordance with an embodiment, a ReferenceCountedExtension 430 finds application object 420 ("host beans") and finds wherever there are references to entity manager 410. These application objects are requesting objects that request, for example, the entity managers 410. Via the portable extension, then, CDI can monitor the lifecycle of the application objects 420, via, for example, traffic management and traffic overseeing, to observe the lifecycle of any given application object within the purview of CDI.

In accordance with an embodiment, the ReferenceCountedExtension 430 further observes the destruction of these application objects 420, via the portable extension discussed above, and, when destruction occurs, it calls decrementReferenceCount( ) on the ReferenceCountedContext 400. In this way, the ReferenceCountedExtension 430 monitors the lifecycle of the requesting application objects to determine when each lifecycle of such objects ends. Upon the cessation of the lifecycle, the ReferenceCountedExtension 430 calls the ReferenceCountedContext 400 with an instruction to decrement the count within the cache (not shown) of the created object (e.g., entity manager) by 1, corresponding to the destruction of the requesting/referring bean.

In accordance with an embodiment, when the ReferenceCountedContext's reference count for that ReferenceCounted bean drops to zero, the ReferenceCountedContext destroys the ReferenceCounted bean.

Figure 5:
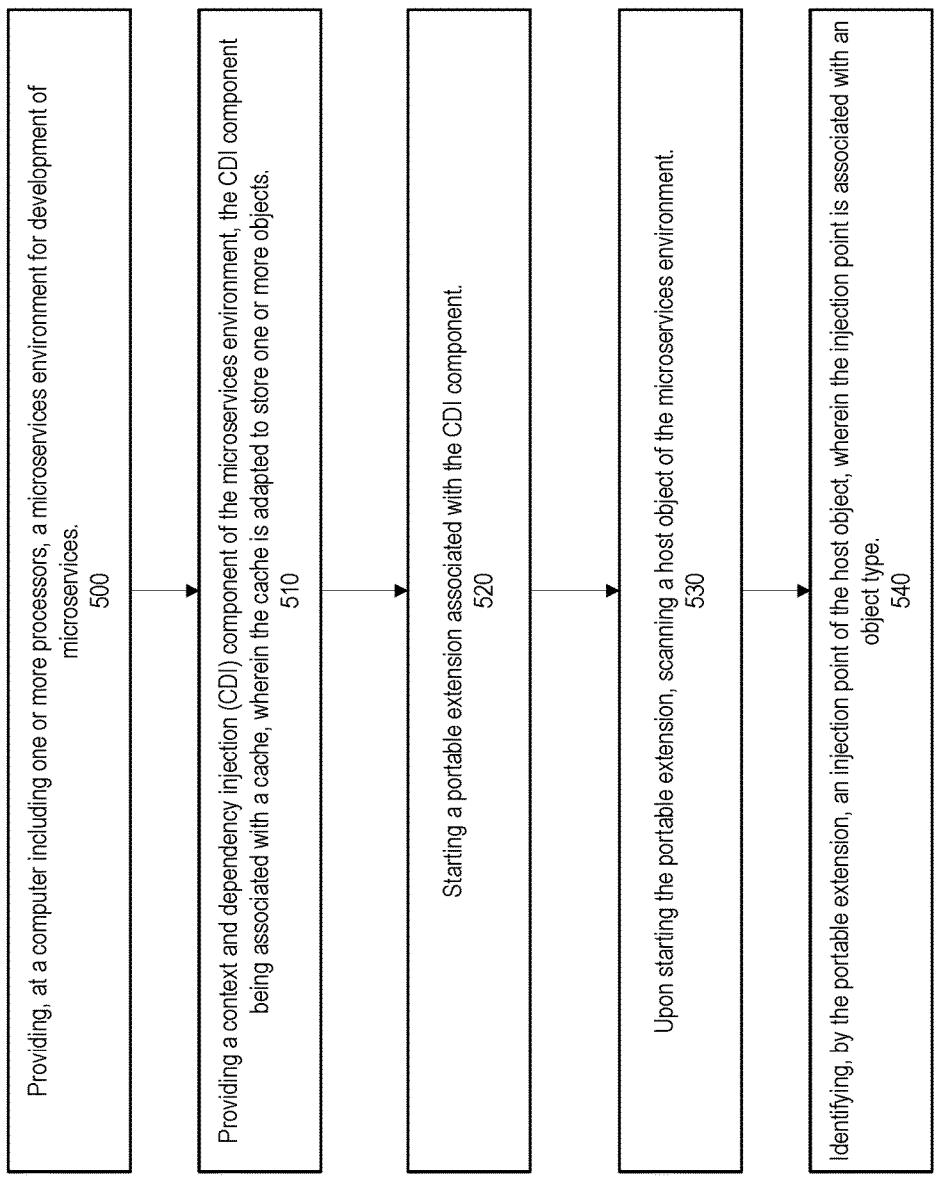
FIG. 5 is a flowchart of a method for managing reference counted lifecycles of contexts and dependency injection (CDI) components, in accordance with an embodiment.

FIG. 5 is a flowchart of a method for managing reference counted lifecycles of contexts and dependency injection (CDI) components, in accordance with an embodiment.

In accordance with an embodiment, at step 500, the method can provide, at a computer including one or more processors, a microservices environment for development of microservices.

In accordance with an embodiment, at step 510, the method can provide a context and dependency injection (CDI) component of the microservices environment, the CDI component being associated with a cache, wherein the cache is adapted to store one or more objects.

In accordance with an embodiment, at step 520, the method can start a portable extension associated with the CDI component.

In accordance with an embodiment, at step 530, upon starting the portable extension, the method can scan a host object of the microservices environment.

In accordance with an embodiment, at step 540, the method can identify, by the portable extension, an injection point of the host object, wherein the injection point is associated with an object type.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for managing reference counted lifecycles of contexts and dependency injection (CDI) components, comprising:
    a computer including one or more processors, that provides a microservices environment for development of microservices;
    a context and dependency injection (CDI) component of the microservices environment, the CDI component being associated with a cache, wherein the cache is adapted to store one or more objects; and
    a portable extension associated with the CDI component,
    wherein upon startup of the portable extension, the portable extension scans a host object of the microservices environment,
    wherein the portable extension identifies an object-type specific CDI injection point of the host object within the microservices environment, wherein the injection point is associated with a specific object type;
    wherein upon a call from the host object for an object of the specific object type, an instance of the specific object type is provided to the host object; and
    wherein upon the instance of the specific object type being provided to the host object, the portable extension wraps the host object such that on a destruction of the host object, the wrap produces a signal which is provided to the portable extension, the signal indicating to the portable extension that the host object has been destroyed.

2. The system of claim 1, wherein the specific object type comprises an entity manager.

3. The system of claim 2, wherein upon providing the instance of the specific object type, a count at the cache is incremented, the count being associated with the object of the specific object type.

4. The system of claim 3, wherein the portable extension monitors the lifecycle of the host object.

5. The system of claim 4, wherein, based upon the monitoring, the portable extension detects an end of the lifecycle of the host object.

6. The system of claim 5, wherein upon detecting the end of the lifecycle of the host object, a decrement to the count associated with the object of the specific object type is called within the cache.

7. The system of claim 6, wherein upon decrementing the count associated with the object of the specific object type within the cache to zero, the object of the specific object type is destroyed.

8. A method for managing reference counted lifecycles of contexts and dependency injection (CDI) components, comprising:
    providing, at a computer including one or more processors, a microservices environment for development of microservices;
    providing a context and dependency injection (CDI) component of the microservices environment, the CDI component being associated with a cache, wherein the cache is adapted to store one or more objects;
    starting a portable extension associated with the CDI component;
    upon starting the portable extension, scanning a host object of the microservices environment;
    identifying, by the portable extension, an object-type specific CDI injection point of the host object within the microservices environment, wherein the injection point is associated with a specific object type; and
    upon a call from the host object for an object of the specific object type, providing an instance of the specific object type to the host object; and
    wherein upon the instance of the specific object type being provided to the host object, the portable extension wraps the host object such that on a destruction of the host object, the wrap produces a signal which is provided to the portable extension, the signal indicating to the portable extension that the host object has been destroyed.

9. The method of claim 8,
    wherein the specific object type comprises an entity manager.

10. The method of claim 9, further comprising:
    upon providing the instance of the specific object type, incrementing a count at the cache, the count being associated with the object of the specific object type.

11. The method of claim 10, further comprising:
    monitoring, by the portable extension, the lifecycle of the host object.

12. The method of claim 11, further comprising:
    based upon the monitoring, detecting, by the portable extension, an end of the lifecycle of the host object.

13. The method of claim 12, further comprising:
    upon detecting the end of the lifecycle of the host object, calling a decrement to the count associated with the object of the specific object type within the cache.

14. The method of claim 13,
    upon decrementing the count associated with the object of the specific object type within the cache to zero, destroying the object of the specific object type.

15. A non-transitory computer readable storage medium having instructions thereon for managing reference counted lifecycles of contexts and dependency injection (CDI) components, which when read and executed cause a computer to perform steps comprising:
    providing, at a computer including one or more processors, a microservices environment for development of microservices;
    providing a context and dependency injection (CDI) component of the microservices environment, the CDI component being associated with a cache, wherein the cache is adapted to store one or more objects;
    starting a portable extension associated with the CDI component;
    upon starting the portable extension, scanning a host object of the microservices environment;
    identifying, by the portable extension, an object-type specific CDI injection point of the host object within the microservices environment, wherein the injection point is associated with a specific object type; and
    upon a call from the host object for an object of the specific object type, providing an instance of the specific object type to the host object; and
    wherein upon the instance of the specific object type being provided to the host object, the portable extension wraps the host object such that on a destruction of the host object, the wrap produces a signal which is provided to the portable extension, the signal indicating to the portable extension that the host object has been destroyed.

16. The non-transitory computer readable storage medium of claim 15,
    wherein the specific object type comprises an entity manager.

17. The non-transitory computer readable storage medium of claim 16, further comprising:
    upon providing the instance of the specific object type, incrementing a count at the cache, the count being associated with the object of the specific object type.

18. The non-transitory computer readable storage medium of claim 17, further comprising:
    monitoring, by the portable extension, the lifecycle of the host object.

19. The non-transitory computer readable storage medium of claim 18, further comprising:
    based upon the monitoring, detecting, by the portable extension, an end of the lifecycle of the host object.

20. The non-transitory computer readable storage medium of claim 19, further comprising:
    upon detecting the end of the lifecycle of the host object, calling a decrement to the count associated with the object of the specific object type within the cache; and
    upon decrementing the count associated with the object of the specific object type within the cache to zero, destroying the object of the specific object type.

* * * * *